(12) United States Patent
Lee et al.

(10) Patent No.: US 6,829,382 B2
(45) Date of Patent: Dec. 7, 2004

(54) STRUCTURE-GUIDED AUTOMATIC ALIGNMENT FOR IMAGE PROCESSING

(76) Inventors: Shih-Jong J. Lee, 15418 SE. 53rd Pl., Bellevue, WA (US) 98006; Seho Oh, 5229 107th St. SW., Mukilteo, WA (US) 98275

( * ) Notice: Subject to any disclaimer, the term of this patent is extended or adjusted under 35 U.S.C. 154(b) by 610 days.

(21) Appl. No.: 09/882,734

(22) Filed: Jun. 13, 2001

(65) Prior Publication Data

US 2003/0026473 A1 Feb. 6, 2003

(51) Int. Cl.$^7$ .............................................. G06K 9/00
(52) U.S. Cl. ................... 382/151; 382/152; 382/190; 382/199; 382/201
(58) Field of Search .............................. 382/151, 152, 382/294, 287, 291, 190, 199, 201

(56) References Cited

U.S. PATENT DOCUMENTS

| | | | | |
|---|---|---|---|---|
| 5,371,690 A | * | 12/1994 | Engel et al. | 382/151 |
| 5,586,058 A | * | 12/1996 | Aloni et al. | 702/35 |
| 5,694,482 A | * | 12/1997 | Maali et al. | 382/151 |
| 5,805,722 A | * | 9/1998 | Cullen et al. | 382/146 |
| 5,818,443 A | * | 10/1998 | Schott | 382/141 |
| 6,614,926 B1 | * | 9/2003 | Fix et al. | 382/150 |
| 6,748,112 B1 | * | 6/2004 | Nguyen et al. | 382/203 |

* cited by examiner

Primary Examiner—Bhavesh M. Mehta
Assistant Examiner—John Strege

(57) ABSTRACT

When application domain structure information is erroneously encoded into parameters for image processing and measurements the accuracy of the result can degrade. A structure-guided automatic alignment system for image processing receives an image input and application domain structure input and automatically creates an estimated structure output having improved alignment. Measurement and image processing robustness are improved.

9 Claims, 15 Drawing Sheets

STRUCTURE-GUIDED AUTOMATIC ALIGNMENT FOR IMAGE PROCESSING

CO-PENDING U.S. PATENT APPLICATIONS

1. U.S. patent application Ser. No. 09/693,723, "Image Processing System with Enhanced Processing and Memory Management", by Shih-Jong J. Lee et. al., filed Oct. 20, 2000
2. U.S. patent application Ser. No. 09/693,378, "Image Processing Apparatus Using a Cascade of Poly-Point Operations", by Shih-Jong J. Lee, filed Oct. 20, 2000
3. U.S. patent application Ser. No. 09/692,948, "High Speed Image Processing Apparatus Using a Cascade of Elongated Filters Programmed in a Computer", by Shih-Jong J. Lee et. al., filed Oct. 20, 2000
4. U.S. patent application Ser. No. 09/703,018, "Automatic Referencing for Computer Vision Applications", by Shih-Jong J. Lee et. al., filed October 31, 2000
5. U.S. patent application Ser. No. 09/702,629, "Run-Length Based Image Processing Programmed in a Computer", by Shih-Jong J. Lee, filed October 31, 2000
6. U.S. patent application Ser. No. 09/738,846 entitled, "Structure-guided Image Processing and Image Feature Enhancement" by Shih-Jong J. Lee, filed Dec. 15, 2000.
7. U.S. patent application Ser. No. 09/739,084 entitled, "Structure Guided Image Measurement Method", by Shih-Jong J. Lee et. al., filed Dec. 14, 2000.
8. U.S. patent application entitled, "Automatic Detection of Alignment or Registration Marks", by Shih-Jong J. Lee et. al., filed Mar. 23, 2001
9. U.S. patent application entitled, "Automatic Template Generation and Searching Method", Seho Oh et. al., filed Apr. 12, 2001.
10. U.S. patent application entitled, "Robust Method for Image Feature Estimation", by Seho Oh et. al., filed May 31, 2001.
11. U.S. patent application entitled, "Structure-guided Automatic Learning for Image Feature Enhancement", by Shih-Jong J. Lee et. al., filed May 23, 2001.

REFERENCES

1. Lee, J S J, Haralick, R M and Shapiro, L G, "Morphologic Edge Detection," IEEE Trans. Robotics and Automation RA3(2): 142–56, 1987.
2. Serra, J, "Image analysis and mathematical morphology," London: Academic, 1982, pp 318–321.
3. Draper N R and Smith H, "Applied Regression Analysis", John Wiley & Sons, Inc., 1966, PP.7–13.
4. Duda, R O and Hart P E, "Pattern Classification and Scene Analysis," John Wiley and Sons, New York, 1973, PP.332–335.
5. Haralick R M and Shapiro, L G, "Survey Image Segmentation Techniques," Comput. Vision, Graphics Image Processing, vol. 29: 100–132, 1985.
6. Silver, B, "Geometric Pattern Matching for General-Purpose Inspection in Industrial Machine Vision", Intelligent Vision '99 Conference—Jun. 28–29, 1999
7. Otsu N, "A Threshold Selection Method from Gray-level Histograms," IEEE Trans. System Man and Cybernetics, vol. SMC-9, No. 1, January 1979, PP 62–66. Sternberg, S R, "Grayscale Morphology," Comput. Vision, Graphics, and Image Processing, vol. 35 No. 3: 333–355, September 1986.
8. Stuart Geman et. al., "Stochastic Relaxation, Gibbs Distributions, and the Bayesian Restoration of Images", Transactions on Pattern Analysis and Machine Intelligence, Vol. PAMI-6, No. 6, November 1984, pp. 721–741.

TECHNICAL FIELD

This invention relates to image processing methods for automatic alignment between image features and defined structures.

BACKGROUND OF THE INVENTION

Many computer vision applications require the enhancement and detection of image features for objects of interest detection, measurement and/or classification. Application domain knowledge is available in most of the computer vision applications. The application domain knowledge can often be represented as structures of image features such as edges, lines and regions. The structure information can be well defined in industrial applications such as semiconductor manufacturing, electronic assembly or machine part inspections. In machine part inspections, most of the work-pieces have Computer Aided Design (CAD) data available that specifies its components as entities (LINE, POINT, 3DFACE, 3DPOLYLINE, 3DVERTEX, etc.) and blocks of entities. In biomedical or scientific applications, structure information can often be loosely defined. For example, a cell nucleus is round and different shapes differentiate different types of blood cells or chromosomes.

Application domain structure information is often encoded into parameters for image processing and measurements. Structure-guided methods are used to enhance and measure image features along the directions of the image structures of interest. These methods provide sub-pixel, high performance image feature extraction, enhancement and measurements as described in U.S. patent application Ser. No. 09/738,846 entitled, "Structure-guided Image Processing and Image Feature Enhancement" by Shih-Jong J. Lee, filed Dec. 15, 2000 and U.S. patent application Ser. No. 09/739,084 entitled, "Structure Guided Image Measurement Method", by Shih-Jong J. Lee et. al., filed Dec. 14, 2000 and U.S. Patent Application entitled, "Structure-guided Automatic Learning for Image Feature Enhancement", by Shih-Jong J. Lee et. al., filed May 23, 2001. However, the processing and measurement results are dependent on the accuracy of the structure specifications. The results could be erroneous if the image features mismatch the defined structures.

A general-purpose computer vision system provides teaching functions that encode application domain structure information and processing algorithms into the system and application functions that process new images using the encoded structure information and processing algorithms. In the teaching phase, human error could cause mismatch of image features with defined structure. In the application phase, mismatch could occur due to imperfect repeatability of the stage or misplacement of the objects of interest. The mismatch could significantly degrade the effectiveness of a computer vision system.

PRIOR ART

Prior art relies on tight control of the alignment between structure specification and objects of interest. This approach is costly, is subject to error, and produces a non-robust result. This invention provides a method that automatically detects and compensates for misalignment between image features and defined structures.

OBJECTS AND ADVANTAGES

It is an object of the invention to automatically align image features with defined structures. The method of this invention facilitates high quality, consistent and reliable image processing results.

Another objective of this invention is to allow a low skill operator to encode application domain structure into a structure-guided image processing system and to accept reasonable errors in accomplishing that task.

A further objective of this invention is to allow effective computer vision applications in a not well-controlled environment where accurate placement of objects of interest cannot be guaranteed.

SUMMARY OF THE INVENTION

Many computer vision applications require the enhancement and detection of image features for objects of interest detection, measurement and/or classification. Application domain knowledge is available in most of the computer vision applications. The application domain knowledge can often be represented as structures of image features such as edges, lines and regions. Structure-guided methods are used to enhance and measure image features of the image structures of interest. These methods provide sub-pixel, high performance image feature extraction, enhancement and measurement.

A general-purpose computer vision system provides teaching functions that encode application domain structure information and processing algorithms into the machine vision system and application functions that process new images using the encoded structure information and processing algorithms. In the teaching phase, input error could cause mismatch between image features and application domain structure information. In the application phase, mismatch could occur due to imperfect repeatability of the inspection stage or misplacement of the objects of interest. The invention method improves on the alignment of application domain structure information with image features, thereby enhancing accuracy, repeatability, and robustness of objects of interest detection, measurement and/or classification.

In a preferred embodiment of the invention, the image structure and measurement/detection targets are specified using a caliper approach. The method divides a defined structure region into mutually exclusive sub-regions. It performs robust structure-guided estimation within each sub-region and then performs a robust structure-guided estimation combining all sub-regions. The automatic alignment method of this invention includes a structure estimation step, an alignment decision step and a structure alignment step.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE INVENTION

Many computer vision applications require the enhancement and detection of image features for objects of interest detection, measurement and/or classification. Application domain knowledge is available in most of the computer vision applications. The application domain knowledge can often be represented as structures of image features such as edges, lines and regions. The structure information can be well defined in industrial applications such as semiconductor manufacturing, electronic assembly or machine part inspections. In machine part inspections, most of the work-pieces have Computer Aided Design (CAD) data available that specifies its components as entities (LINE, POINT, 3DFACE, 3DPOLYLINE, 3DVERTEX, etc.) and blocks of entities. In biomedical or scientific applications, structure information can often be loosely defined. For example, a cell nucleus is usually round and different shapes differentiate different types of blood cells or chromosomes.

Application domain structure information is often encoded into parameters for image processing and measurements. Structure-guided methods are used to enhance and measure image features of the image structures of interest.

These methods provide sub-pixel, high performance image feature extraction, enhancement and measurements as described in U.S. patent application Ser. No. 09/738,846 entitled, "Structure-guided Image Processing and Image Feature Enhancement" by Shih-Jong J. Lee, filed Dec. 15, 2000 and U.S. patent application Ser. No. 09/739,084 entitled, "Structure Guided Image Measurement Method", by Shih-Jong J. Lee et. al., filed Dec. 14, 2000 and U.S. patent application entitled, "Structure-guided Automatic Learning for Image Feature Enhancement", by Shih-Jong J. Lee et. al., filed May 23, 2001. However, the processing and measurement results are dependent on the accuracy of the structure specifications. The results could be erroneous if the image features misalign with the defined structures.

A general-purpose computer vision system provides teaching functions that encode application domain structure information and processing algorithms into the system and application functions that process new images using the encoded structure information and processing algorithms. In the teaching phase, human error could cause mismatch of image feature with defined structure. In the application phase, mismatch could occur due to imperfect repeatability of the inspection stage or misplacement of the objects of interest. The mismatch could degrade the effectiveness of a computer vision system.

I. Structure-Guided Image Processing System

Figure 1:
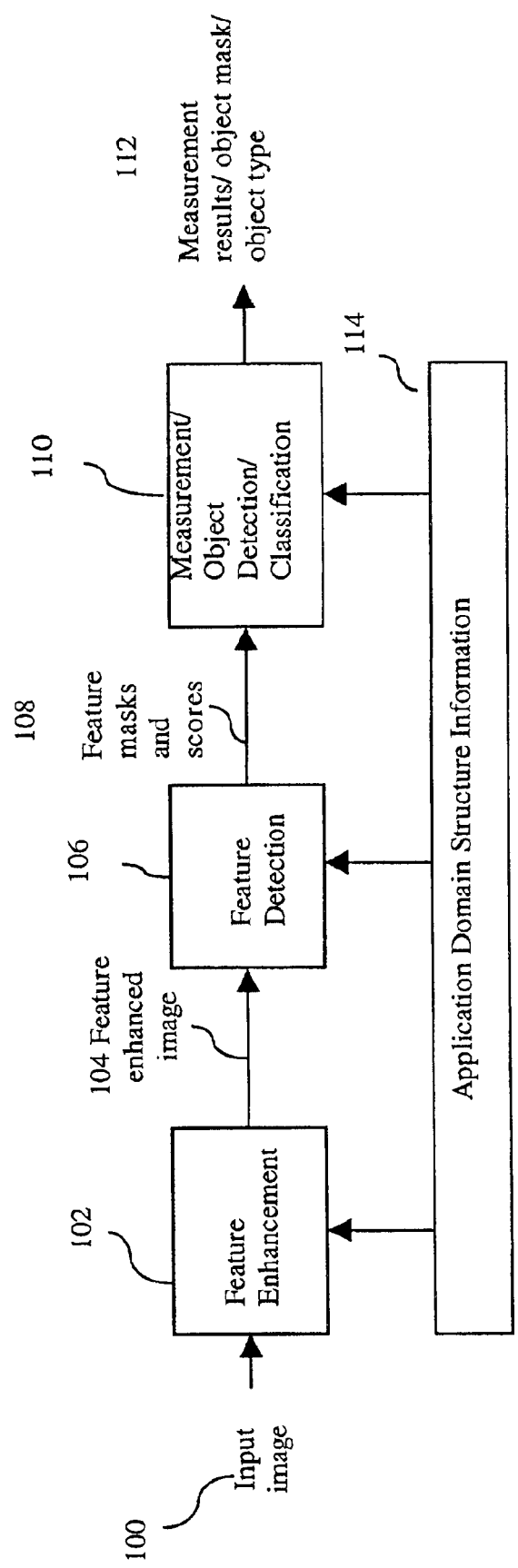
FIG. 1 shows an image measurement/object detection/object classification system.

FIG. 1 shows the processing flow of an application scenario of this invention. It consists of a structure-guided image processing system for image feature measurement, object detection or object classification. As shown in FIG. 1, a structure-guided image feature enhancement module 102 processes the input image 100 to enhance image features of interest and remove noise or irrelevant information. A method to automatically design the feature enhancement processing sequence and parameters is disclosed in co-pending U.S. patent application entitled, "Structure-guided Automatic Learning for Image Feature Enhancement", by Shih-Jong J. Lee et. al., filed May 23, 2001 which is incorporated in its entirety herein. The feature-enhanced image is the basis for a feature detection module 106 that detects potential feature masks and generates feature scores 108. Feature scores are the strengths/weights/likelihood values of the features of interest for pixels within potential feature masks. Potential feature masks can be generated using the methods disclosed in U.S. patent application Ser. No. 09/738,846 entitled, "Structure-guided Image Processing and Image Feature Enhancement" by Shih-Jong J. Lee, filed Dec. 15, 2000 which is incorporated in its entirety herein. Feature scores are derived in conjunction with feature extraction processes. By choosing the proper structuring element for the feature extraction processing sequence, structure-guided feature extraction can be efficiently accomplished. In one embodiment, features of different structures are extracted using directional elongated structuring elements. A directional elongated structuring element has limited width in one of its dimensions. If the measurement of (or within) an object boundary is desired, boundary masks are generated. In one embodiment of the invention, boundary masks are generated using a general edge detection method. A connected component labeling step (ref: U.S. patent application Ser. No. 09/702,629, "Run-Length Based Image Processing Programmed in a Computer", by Shih-Jong J. Lee, filed Oct. 31, 2000) is applied to the boundary masks to assign a unique label for each connected component of the mask image. The purpose of the generated masks is to provide rough regions of interest for feature scoring based upon fine grayscale detection or measurement.

I.1 Bright Edge Extraction

In a preferred embodiment, bright edges are extracted by a grayscale erosion residue processing sequence defined as:

$$I - I \ominus A$$

Where I is an input image, A is a structuring element and $\ominus$ is the grayscale morphological erosion operation (Stemberg, SR, "Gray-scale morphology," Computer Vision, Graphics Image Processing, vol. 35, pp333–355, 1986).

I.2 Dark Edge Extraction

In a preferred embodiment, Dark edges are extracted by a grayscale dilation residue processing sequence defined as:

$$I \oplus A - I$$

Where $\oplus$ is the grayscale morphological dilation operation.

I.3 General Edge Extraction

General edges (both dark and bright edges) can be extracted by the difference of grayscale dilation and erosion defined as:

$$I \oplus A - I \ominus A$$

I.4 Bright Line/Region Extraction:

In a preferred embodiment, bright lines/regions are extracted by a grayscale opening residue processing sequence defined as:

$$I - (I \circ A)$$

where $\circ$ is the grayscale morphological opening operation.

I.5 Dark Line/Region Extraction:

Dark lines/regions can be extracted by a grayscale closing residue processing sequence defined as:

$$(I \bullet A) - I$$

where $\bullet$ is the grayscale morphological closing operation.

I.6 Region Contrast Extraction:

In one embodiment of the invention, region contrast is extracted by the difference of grayscale closing and opening operations on the input image. The processing sequence is defined as:

$$(I \bullet A) - (I \circ A)$$

I.7 Region Boundary Extraction:

Since two sides of a line are also edges, edge extraction operations will extract lines as well as edges. When using the same structure element, the edge extraction results, (bright edge extraction, dark edge extraction and general edge extraction), include the corresponding line/region extraction results (bright line/region extraction, dark line/region extraction, and region contrast extraction). A region boundary consists of only edges that are in the boundaries of large regions and excludes edges from narrow lines.

In a preferred embodiment, a bright region boundary is the difference between grayscale morphological opening and erosion:

$$I \circ A - I \ominus A$$

Similarly, a dark region boundary is the difference between grayscale morphological dilation and closing:

$$I \oplus A - I \bullet A$$

And a general region boundary is the difference between the summation of grayscale morphological opening and dilation and the summation of grayscale morphological erosion and closing:

$$(I \circ A + I \oplus A) - (I \ominus A + I \bullet A).$$

I.8 Caliper Regions

In another embodiment of this invention, caliper regions are defined by users in lieu of mask generation. Within the caliper region the feature scores are determined by a differential method along scan lines of the calipers. An example of the differential method is a convolution with the following kernel specification (−1,−1,−1,−1,0,1,1,1,1) followed by a feature detection. In addition, feature masks can be determined by thresholding the feature scores.

I.9 Uses of Feature Masks and Feature Scores within Caliper or Mask Defined Regions The detected feature masks and feature scores can be used for structure-guided estimation and measurement as disclosed in co-pending U.S. patent application Ser. No. 09/739,084 entitled, "Structure Guided Image Measurement Method", by Shih-Jong J. Lee et. al., filed Dec. 14, 2000 wherein two dimensional geometry estimation uses grayscale images as weights for each connected component in the measurement mask. The estimation is based on a grayscale weight image rather than a binary image. The estimation is guided by structure constraints defined from application domain knowledge to increase accuracy. It uses structure constraints to link multiple features for an integrated estimation that utilizes a large number of points (large n). Large n reduces the measurement ambiguity. The results of the structure-guided estimation are symbolic representation of geometry entities such as lines, points, arcs and circles.

The detected feature masks and feature scores can also be used for object detection and classification. Potential objects of interest include defects in a semiconductor wafer or machine parts in video inspection applications. Application domain structure information 114 provides the parameters for structure-guided feature enhancement, structured-guided feature detection and structured-guided measurement/object detection/object classification 110 as shown in FIG. 1.

Figure 2:
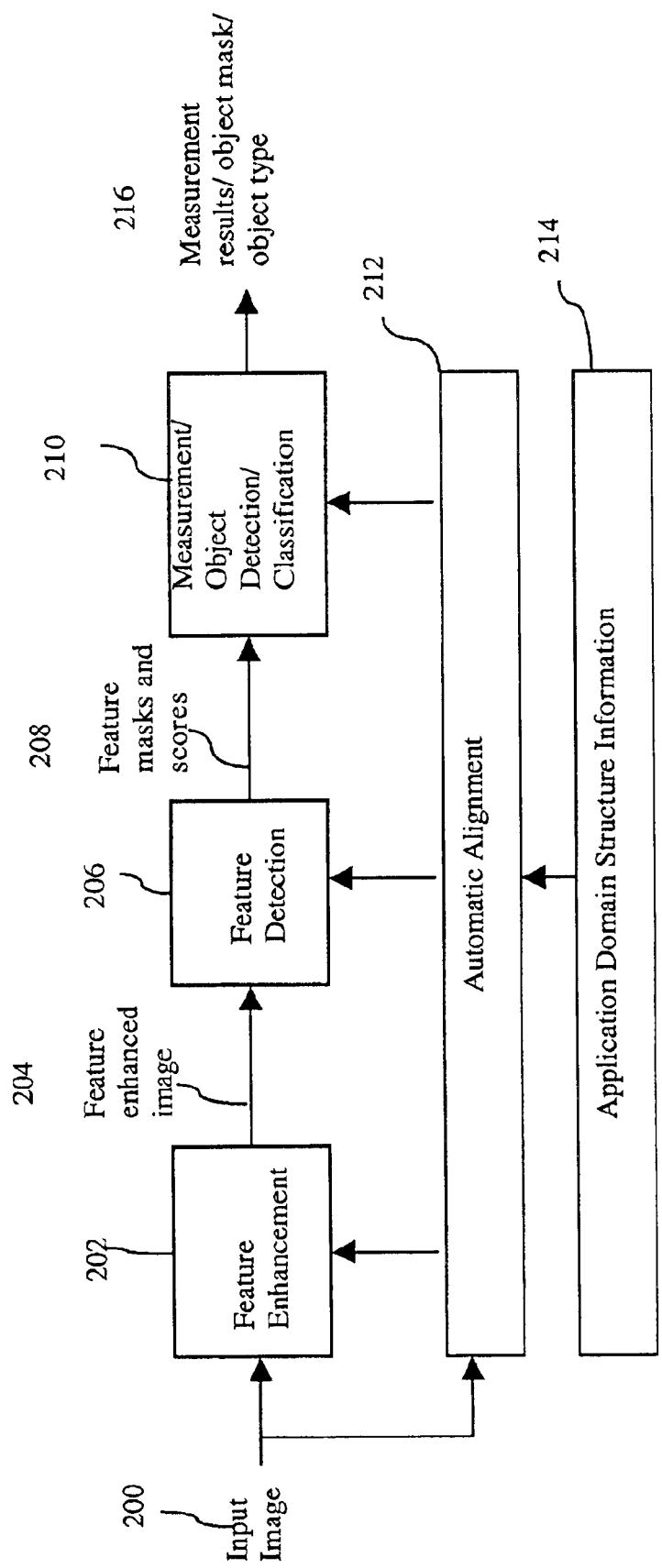
FIG. 2 shows an image measurement/object detection/object classification system with the assistance of automatic alignment.

FIG. 2 shows a structure-guided image processing system with the assistance of the automatic alignment method of this invention. The automatic alignment procedure 212 compares the application domain structure information 214 and the input image 200 features to detect structure misalignment. If misalignment is detected, the application domain structure information can be automatically updated to align the application domain structure information with the actual image features.

II. Application Domain Structure and Measurement/Detection Target Specification

Application domain structure information is specified for a measurement/detection task so the image processing sequence can be properly optimized for the task. The amount and extent of the information needed depends on the difficulty of a measurement or inspection task. Simple tasks require only limited structure and target specification. Complicated tasks in low signal to noise ratio applications may require detailed structure information to help resolve ambiguity and enhance measurement or detection results. To enhance the usability of an image measurement or inspection system, structure information can be automatically derived from Computer Aided Design (CAD) data or from learning images. The structure information includes features of interest and their configuration.

Figure 3C:
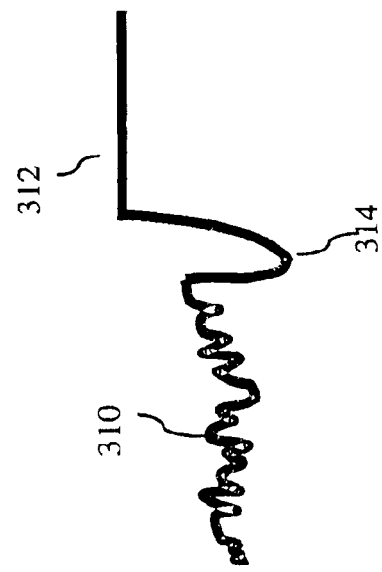
FIG. 3C shows a one-dimensional intensity profile of a dark line between a granular dark region (left) and a uniform bright region (right)
Figure 3B:
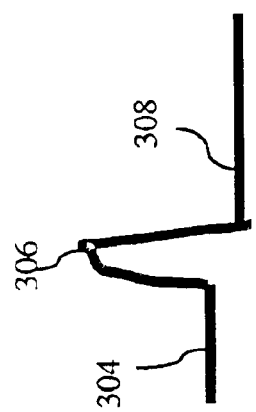
FIG. 3B shows a one-dimensional intensity profile of a bright line between two uniform regions.
Figure 3A:
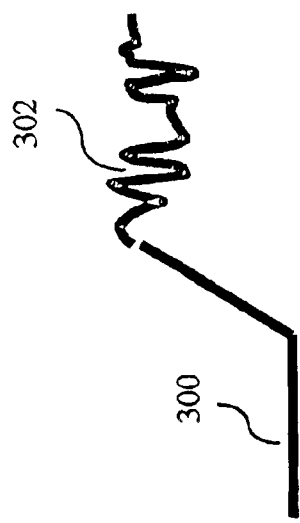
FIG. 3A shows a one-dimensional intensity profile of an edge separating a uniform dark region (left) and a granular bright region (right)

Image boundary types and image region properties can specify target features of interest. Image boundaries separate image regions. Image boundary types include lines or edges. Lines can further be characterized as dark lines or bright lines. Adjacent regions are separated by their boundaries. Region properties reflect the material and geometry of the object surfaces that are imaged by the measurement/detection system. An image region can be classified as uniform, granular, noisy, translucent, patterned, etc. It can be further characterized as a dark or bright region or by its color or color pattern in color images. FIGS. 3A, 3B, 3C show one-dimensional profiles of example edge, lines and regions. In image 3A a dark region 300 is separated from a bright granular region 302. In FIG. 3B a gray region 304 is separated from a dark region 308 by a bright line 306. In FIG. 3C a gray granular region 310 is separated from a bright uniform region 312 by a dark line 314.

Image feature structure characterizes the geometric configuration of the image features of interest. For example, the features can be arranged as linear, circular or arc structures or in multiple dimensions, planar, spherical or cylindrical, or pie shaped.

Measurement/detection target specification includes measurement/detection regions along predefined geometry (lines, circular arcs), etc. In a preferred embodiment of the invention, the image structure and measurement/detection targets are specified using a caliper approach. Types of calipers used include but are not limited to: directional box caliper, circle caliper and arc caliper.

II.1 Directional Box Caliper

Figure 4:
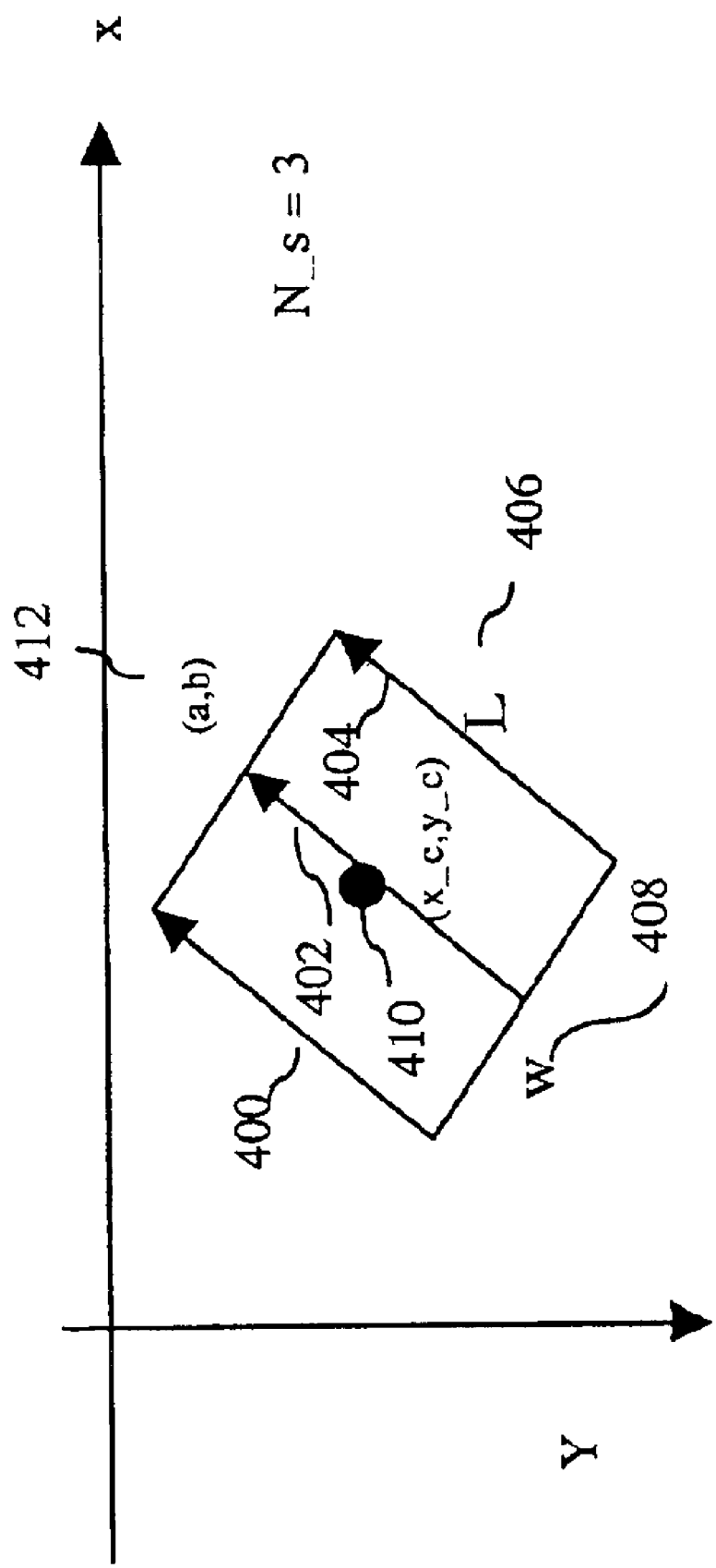
FIG. 4 shows an example of a directional box caliper having 3 scans.

Referring to FIG. 4, a directional box caliper contains a box along a given direction. It can be specified as center 410 ($x\_c$, $y\_c$), direction vector 412 (a, b) where $a^2+b^2=1$ and $b \geq 0$, length 406 (L) along the box direction and width 408 (w) along the orthogonal direction, and the number of detection scans 400, 402, 404 that are equal distance apart. Target feature detection is performed along the detection scans. The direction vector corresponds to lines in the following representation:

$$bx - ay + c = 0$$

The default direction of a box caliper is horizontal. i.e. a direction vector of (0,1). FIG. 4 shows an example of a directional box caliper with 3 scans ($N\_s=3$). Directional box caliper's specify linear features of interest to be detected that are oriented along the direction orthogonal to the direction of the caliper. The linear features of interest are within the region covered by the box caliper and their scale of interest is smaller than the width of the box caliper. Therefore, a large box caliper emphasizes large features and a small box caliper highlights small features.

II.2 Circle Caliper

Figure 5:
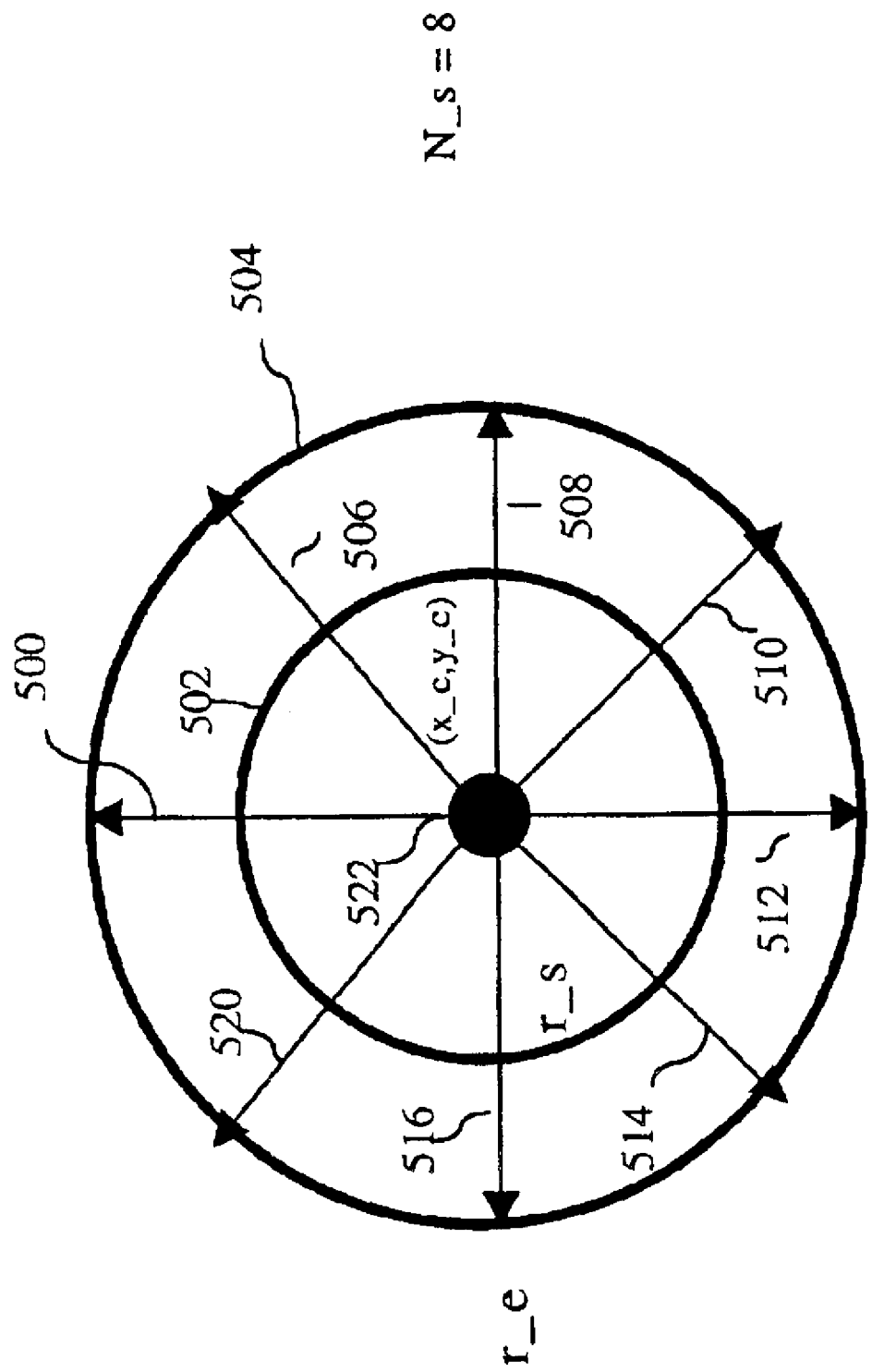
FIG. 5 shows an example of a circle caliper having 8 scans.

Referring to FIG. 5, a circle caliper consists of multiple detection scans 500, 506, 508, 510, 512, 514, 516, 520 arranged radially. The radial scans are equal angle apart oriented outward from the center of the circle. It can be specified as center 522 ($x\_c$, $y\_c$), starting radius 502 ($r\_s$), ending radius 504 ($r\_e$), and the number of radial scans $N\_s$. FIG. 5 shows an example of a circle caliper having 8 scans ($N\_s=8$). Circle caliper's specify circular features of interest that are within the donut-shaped region inside the circle of radius 502 $r\_e$ and outside the circle of radius 504 $r\_s$. That is, the circular features of interest should have radius between $r\_s$ and $r\_e$. A large circle caliper emphasizes large features and a small circle caliper highlights small features.

II.3 Arc Caliper

Figure 6:
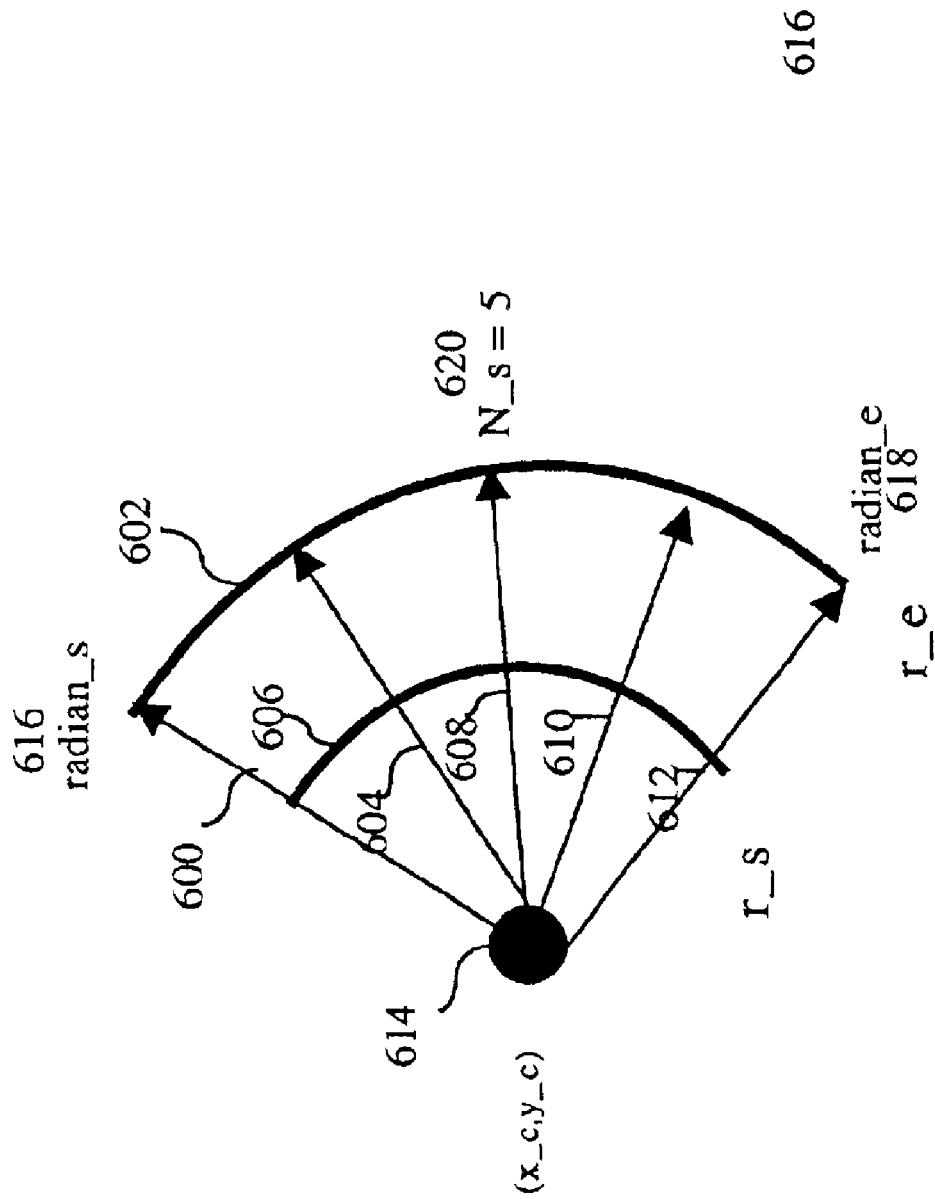
FIG. 6 shows an example of an arc caliper having 5 scans.

Referring to FIG. 6, an arc caliper is a subset of a circle caliper. It consists of multiple detection scans 600, 604, 608, 610, 612 arranged radially to form the region enclosed by an arc 602 and the two line segments 600, 612 connecting the center and two end points of the arc (arc region). The radial scans are equal angle apart oriented outward from the center of the arc. The number of scans equals the number of detections or measurements that will be performed. An arc caliper can be specified as center 614 ($x\_c$, $y\_c$), starting radius 606 ($r\_s$), ending radius 602 ($r\_e$), starting angle 616 (radian$\_s$), ending angle 618 (radianc$\_e$), and the number of radial scans 620 ($N\_s$). For convenience, we may require the ending angle be greater than the starting angle and the angle increases clock-wise. We define the angle of horizontal axis as 0 radian. Note that arc caliper can be specified through a graphical user interface where users specify two end points and at least one more point of the arc and the internal specification can be automatically determined from the user input. FIG. 6 shows an example of an arc caliper having 5 scans ($N\_s=5$). Arc caliper specifies arc features of interest that are inside the arc region covered by the center and the arc of radius $r\_e$ yet outside the arc region covered by the center and the arc of radius $r\_s$. That is, the arc features of interest should have radius between $r\_s$ and $r\_e$. A large arc caliper emphasizes large features and a small arc caliper highlights small features.

Those skilled in the art should recognize that other means of specifying application domain structure and measurement/detection target specification can be used in this invention.

III Automatic Alignment

Figure 7:
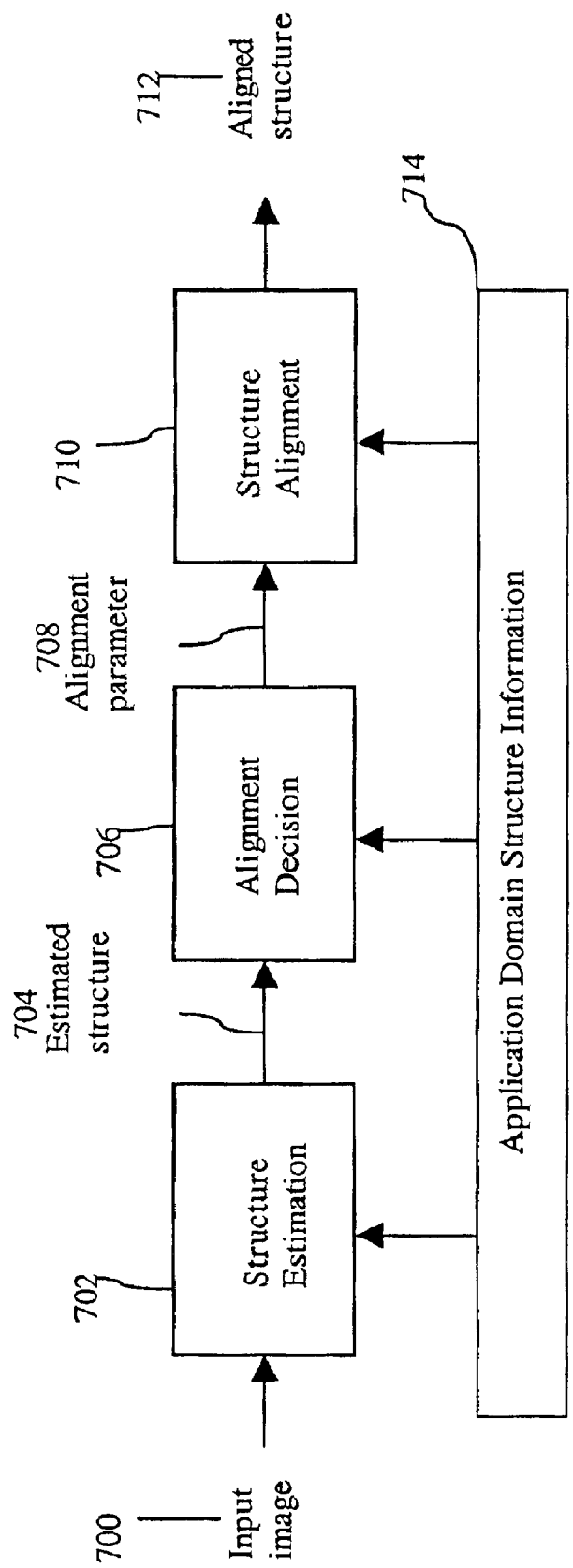
FIG. 7 shows the processing steps for an automatic alignment method.

FIG. 7 shows the automatic alignment method of this invention including a structure estimation step 702, an alignment decision step 706 and a structure alignment step 710. The structure estimation step estimates the feature structure from the input image 700 and the application domain structure information 714 and provides estimated structure output 704. The alignment decision step 706 determines the requirement for a structure alignment 710 and provides alignment parameter output 708. If structure alignment is necessary, a structure alignment step 710 uses the alignment parameters 708 to align the application domain structure with the input features.

III.1 Structure Estimation

Figure 8:
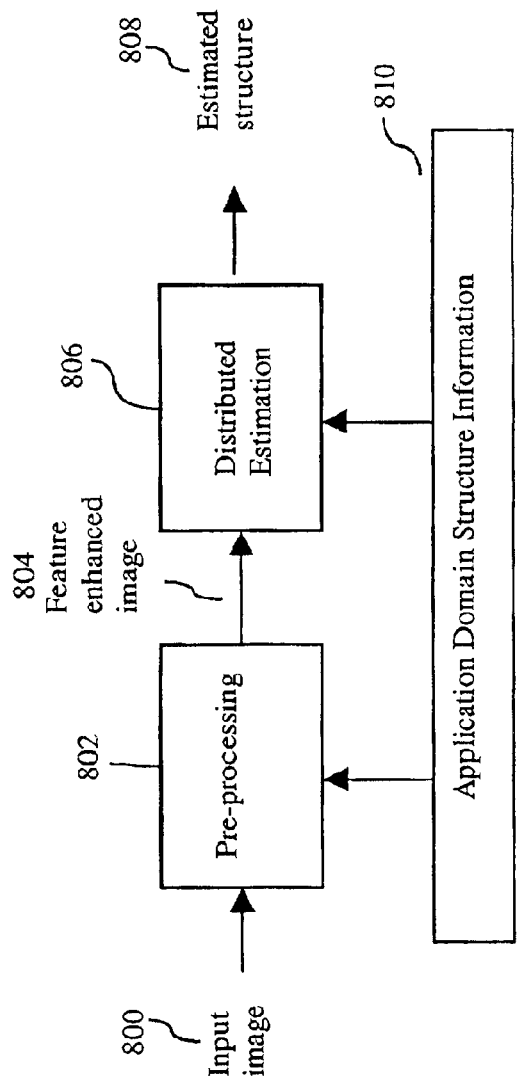
FIG. 8 shows the processing steps for structure estimation.

The structure estimation process 702 includes a pre-processing step 802 and a structure guided distributed estimation step 806 as shown in FIG. 8. The pre-processing step enhances image features and the distributed estimation step estimates parameters of feature structures.

III.1.1 Pre-Processing

Figure 8A:
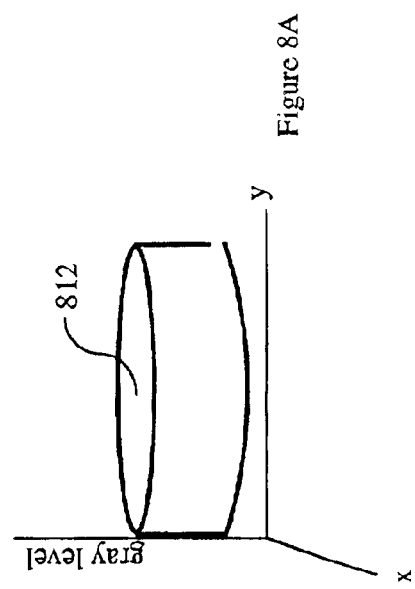
FIG. 8A shows a rod type structuring element having a grayscale thickness.

The pre-processing step 802 extracts features from the caliper region of the input image. In one embodiment of the invention, general edges (both dark and bright edges) are extracted by the difference of grayscale dilation and erosion operations defined as:

$$I \oplus A - I \ominus A$$

Where I is the input image and A is the structuring element. $\oplus$ designates morphological dilation operation and $\ominus$ designates morphological erosion operation. In a preferred embodiment, an isotropic structuring element such as a rod (grayscale disk) is used. Such a structuring element is shown in FIG. 8A wherein the area of the disk 812 corresponds to a selected size and there is a gray level intensity distribution 814 indicated by the three dimensional nature of the rod. Those skilled in the art should recognize that other types of structuring element could be used. Furthermore, other image feature extraction methods can be used for pre-processing as disclosed in U.S. patent application Ser. No. 09/738,846 entitled, "Structure-guided Image Processing and Image Feature Enhancement" by Shih-Jong J. Lee, filed Dec. 15, 2000 which is incorporated in its entirety herein. In addition, noise removal filtering can be applied to the feature extracted image to remove noise.

III.1.2 Distributed Estimation

Figure 9:
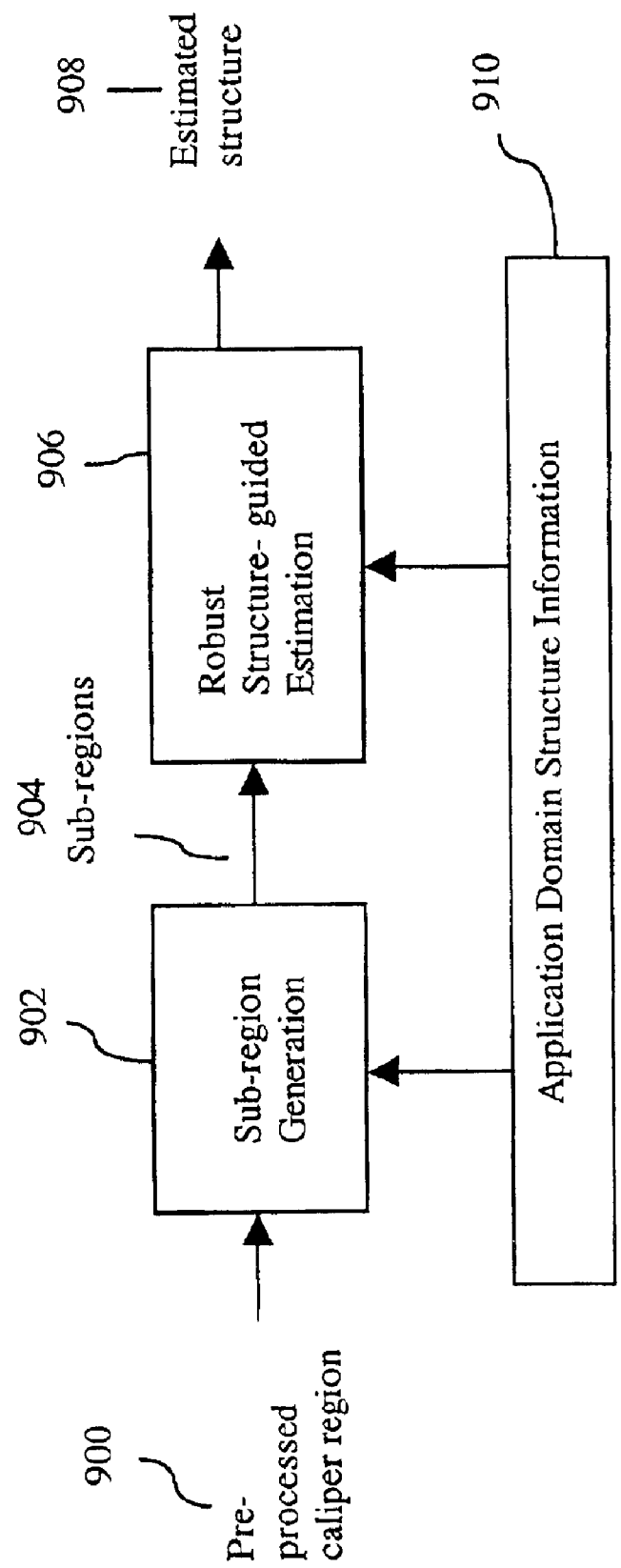
FIG. 9 shows the processing steps for distributed estimation.

The distributed estimation process 806 estimates the structure parameters of the pre-processed image features within a structure region. It consists of a sub-region generation 902 and a robust structure-guided estimation step 906 as shown in FIG. 9. The method divides a structure region into multiple groups of mutually exclusive sub-regions 904. It performs robust structure-guided estimation within each group and then performs a robust structure-guided estimation combining all sub-regions.

III.1.2.1 Sub-Region Generation

The methods for caliper sub-region generation are described in the following sections.

Box Caliper

Figure 10:
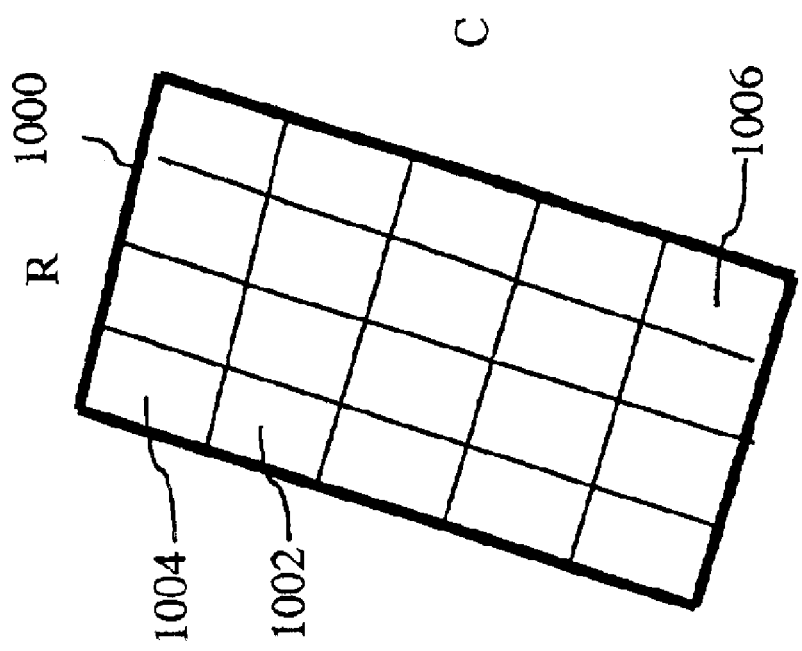
FIG. 10 shows an example of a 5 by 4 division of a box caliper region.

In one embodiment of the invention, a box caliper region 1000 is divided into R by C equal sub-regions (e.g. 1004, 1002, 1006) as shown in FIG. 10. Each sub-region has the same direction as the box caliper. The size of each sub-region can be determined from application specific information such as the expected alignment tolerance of the objects of interest. It can also be defined as a function of the size of the feature pre-processing structuring element A, Size$\_A$. For example, the column size can be defined as 2* Size$\_A$ and the row size can be defined as 4* Size$\_A$. The size can further be adjusted according to the direction of the box caliper. For example, if the direction of the box caliper is close to the horizontal axis (direction of feature is close to the vertical axis), the column size can be reduced yet the row size should be increased to assure a good direction estimate.

Circle Caliper

Figure 11:
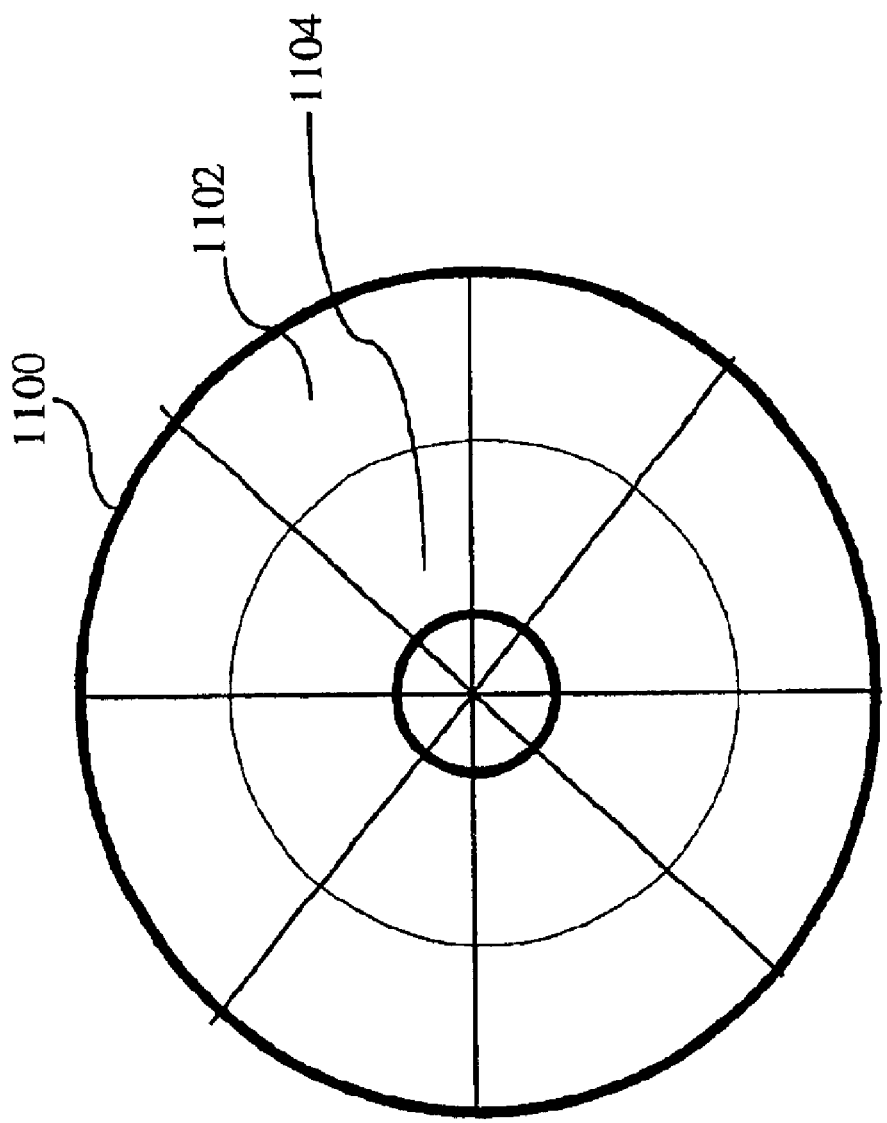
FIG. 11 shows an example of an 8 by 2 division of a circle caliper region.

In one embodiment of the invention, a circle caliper region 1100 is divided into A by R equal angle and equal radial length sub-regions as shown in FIG. 11. The size of each sub-region 1102, 1104 can be determined from application specific information such as the expected alignment tolerance of the objects of interest. It can also be defined as a function of the size of the feature pre-processing structuring element A, Size$\_A$. For example, the radial size can be defined as 2* Size$\_A$ and the minimum arc size can be defined as 4* Size$\_A$.

Arc Caliper

Figure 12:
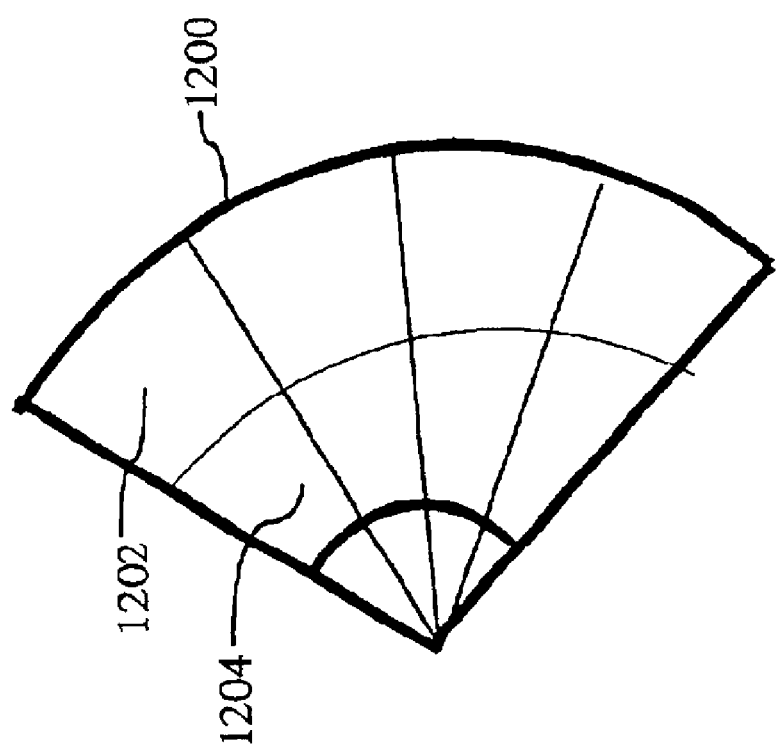
FIG. 12 shows an example of a 4 by 2 division of an arc caliper region.

In one embodiment of the invention, an arc caliper region 1200 is divided into A by R equal angle and equal radial length sub-regions as shown in FIG. 12. The size of each sub-region 1202, 1204 can be determined from application specific information such as the expected alignment tolerance of the objects of interest.

III.1.2.2 Robust Structure-Guided Estimation

Box Caliper

Figure 13:
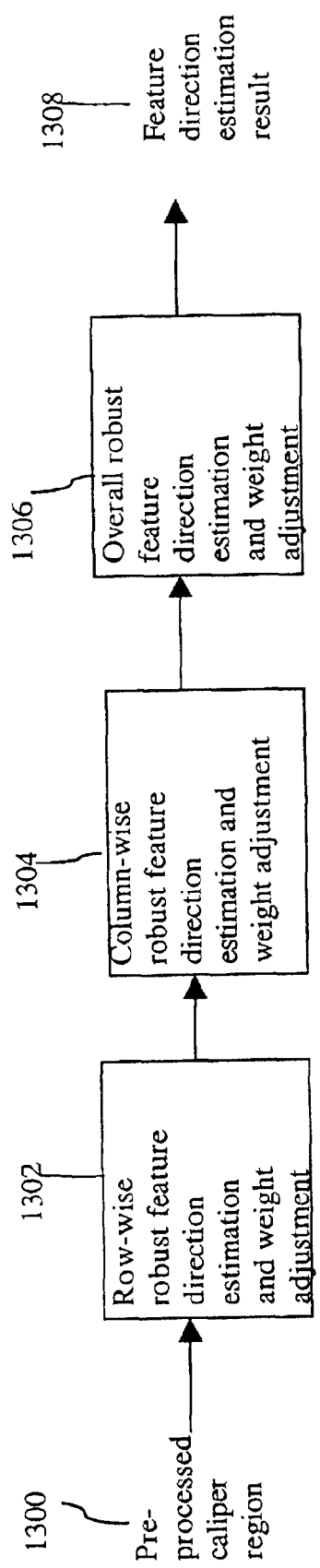
FIG. 13 shows a processing architecture for the robust structure-guided estimation method using a box caliper.

FIG. 13 shows one embodiment of the invention wherein pixels in each sub-region are given weights for feature direction estimation. In the initial state, weights are determined from an image pre-processed caliper region 1300. A robust feature direction estimation and weight adjustment procedure 1302 is performed for each row of the sub-regions. The procedure adjusts the weights of the sub-regions using the direction estimation results. After row-wise estimation and weight adjustment 1302 is performed, the robust feature direction estimation procedure is applied to each column of the sub-regions to further adjust weights 1304. Finally a robust estimate is performed on all sub-regions 1306 to yield the overall feature direction estimate 1308.

In one embodiment of the invention, the robust feature direction estimation and weight adjustment procedure for a group of box caliper sub-regions is:

1. For each sub-region, estimate the feature direction using line estimation without constraints. The cost function for line m at sub-region m can be defined as $$Cost_m = \sum_{i \in L_m} w_i [a_m x_i + b_m y_i + c_m]^2 - \lambda(a_m^2 + b_m^2 - 1)$$

Where $L_m$ is the sub-region defined for the estimation of line m and $w_i$ is the pixel value for pixel i, in the pre-processed image $I_w[x_i][y_i]$ within the sub-region $L_m$. A closed form solution exists for determining $a_m$, $b_m$ and $c_m$ that minimize $Cost_m$.

2. For a group of sub-regions, estimate the feature direction using line estimation constrained by parallelism relation.

The structure constraint includes a group of parallel lines L. The cost function is $$Cost = \sum_{m \in L} \sum_{i \in L_m} w_i [a\ x_i + b\ y_i + c_m]^2 - \lambda(a^2 + b^2 - 1)$$

A closed form solution exists for determining a, b and $c_m$ that minimize cost.

3. Compare the sub-region feature direction estimated in step 1, $a_m$, $b_m$ with the group direction estimate determined in step 2 and adjust weight for the sub-region m based on an error measure related to the difference between $a_m$, $b_m$ and a, b. The weight adjustment method disclosed in U.S. patent application entitled, "Robust Method for Image Feature Estimation", by Seho Oh et. al., filed May 31, 2001 which is incorporated in its entirety herein can be used. This method provides better fitting results by using the previous fitting result to adjust the weight image. The feature mask image and the weight image are used in combination to create best fitting structure parameter values.

In one embodiment of the invention, the pixel values for the weight image in a sub-region m is multiplied by an adjustment factor which is the non-increasing function of the error measure that can be calculated as Euclidean distance between $a_m$, $b_m$ and a, b. That is, $$I_{W\_new}[x][y] = I_w[x][y] * r(\sqrt{(a-a_m)^2 + (b-b_m)^2} ; T)$$

where r(z;T) is a non-increasing function such as $$r(z; T) = \exp(-Z/T),\ r(z; T) = \exp\left(-\frac{z^2}{T^2}\right),\ \text{and}\ r(z; T) = \frac{1}{1+(z/T)^2}.$$

and T is a parameter that determines the magnitude of adjustment and the speed of convergence.

Those skilled in the art should recognize that other error measures, for example the error measures for sub-region m, can be calculated as $$\alpha \sqrt{(a-a_m)^2 + (b-b_m)^2} + (1-\alpha) Cost_m$$

Where α is a combination factor.

4. Repeat steps 2 and 3 using updated weights until the difference is small or a maximum number of iterations is achieved. The resulting a and b are the feature direction estimate outcome of this procedure.

As shown in FIG. 13, the above estimation and weight adjustment procedure is applied to each row of the sub-regions first. The estimation and weight adjustment procedure is then applied to each column of the sub-regions for further weight adjustment. The final estimate of the feature direction is determined by applying the robust estimate procedure to all sub-regions at once.

Circle/Arc Caliper

Figure 14:
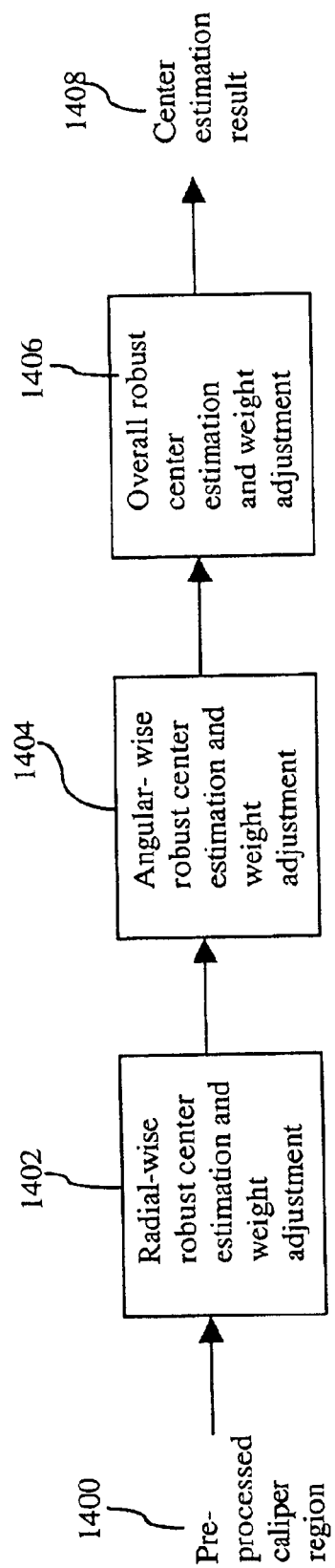
FIG. 14 shows a processing architecture for the robust structure-guided estimation method using circle or arc calipers.

As shown in FIG. 14, in one embodiment of the invention pixels in each sub-region are given weights for center estimation. In the initial state, weights are determined from image pre-processing 1400. A robust circle center estimation procedure 1402 is performed for sub-regions of the same radial segment. The procedure adjusts the weights of the sub-regions using the center estimation results. After radial-wise estimation and weight adjustment is performed, the robust center estimation procedure is applied to sub-regions of the same angular range to further adjust weights 1404. Finally a robust estimate is performed for all sub-regions 1406 to produce a center estimation result 1408.

The robust direction estimation and weight adjustment method for a group of circle/arc caliper sub-regions is:

1. For each sub-region, estimate the center of a circular arc without constraints. The cost function for a circular arc m at sub-region m can be defined as $$(x_{cm}, y_{cm}) = \left(-\frac{a_m}{2}, -\frac{b_m}{2}\right).$$

Where $C_m$ is the sub-region defined for the estimation of circular arc m and $w_i$ is the pixel value for pixel i, in the pre-processed image $I_w[x_i][y_i]$. A closed form solution exists for determining $a_m$, $b_m$ and $c_m$ that minimize $Cost_m$. The center of the circle/circular arc m is located at $$Cost_m = \sum_{i \in C_m} w_i [(x_i^2 + y_i^2) + a_m x_i + b_m y_i + c_m]^2$$

2. For a group of sub-regions, estimate the center of circular arcs constrained by the same center point.

The structure constraint requires that all circle(s)/circular arc(s) have a common unknown center point.

The cost function is $$Cost = \sum_{c_m \in C} \sum_{i \in C_m} w_i [(x_i^2 + y_i^2) + a\ x_i + b\ y_i + c_m]^2$$

A closed form solution exists for determining a, b and $c_m$ for all m ∈ C that minimize Cost.

3. Compare the sub-region center estimated from step 1 with the group center estimate from step 2 for each of the sub-regions. Adjust weight for the sub-regions based on an error measure related to the difference between the center estimates. The weight adjustment method disclosed in the robust estimation method of U.S. patent application entitled, "Robust Method for Image Feature Estimation", by Seho Oh et. al., filed May 31, 2001 which is incorporated in its entirety herein can be used. This method provides better fitting results by using the previous fitting result to adjust the weight image. The feature mask image and the weight image are used in combination to create best fitting structure parameter values.

In one embodiment of the invention, the pixel values for the weight image in a sub-region m is multiplied by an adjustment factor which is the non-increasing function of the error measure that can be calculated as Euclidean distance between $a_m$, $b_m$ and a, b. That is, $$I_{W\_new}[x][y]=I_W[x][y]*r(\sqrt{(a-a_m)^2+(b-b_m)^2},T)$$

where r(z;T) is a non-increasing function such as $$r(z;T) = \exp(-Z/T), \ r(z;T) = \exp\left(-\frac{z^2}{T^2}\right), \text{ and } r(z;T) = \frac{1}{1+(z/T)^2}.$$

and T is a parameter that determines the magnitude of adjustment and the speed of convergence.

Those skilled in the art should recognize that other error measures. For example, the error measures for sub-region m can be calculated as $$\alpha\sqrt{(a-a_m)^2+(b-b_m)^2}+(1-\alpha)Cost_m$$

Where $\alpha$ is a combination factor.

4. Repeat steps 2 and 3 using updated weights until the difference is small or a maximum number of iterations is achieved. The resulting $$(x_c, y_c) = \left(-\frac{a}{2}, -\frac{b}{2}\right)$$

is the center estimate outcome of this procedure.

As shown in FIG. 14, the above center estimate and weight adjustment procedure 1402 is applied to sub-regions of the same radial segment first and then applied to sub-regions of the same angular range for further weight adjustment 1404. The final estimate of the center is determined after applying the robust estimate procedure to all sub-regions at once 1406 to produce the center estimation result 1408.

III.2 Alignment Decision

Figure 15A:
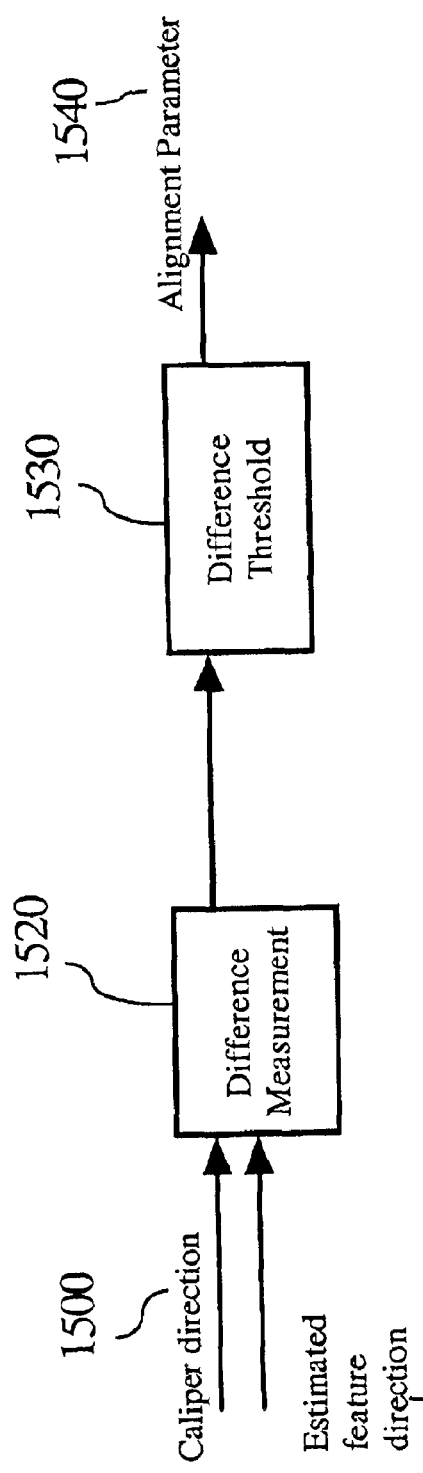
FIG. 15A shows the processing flow of the box caliper alignment decision step.
Figure 15B:
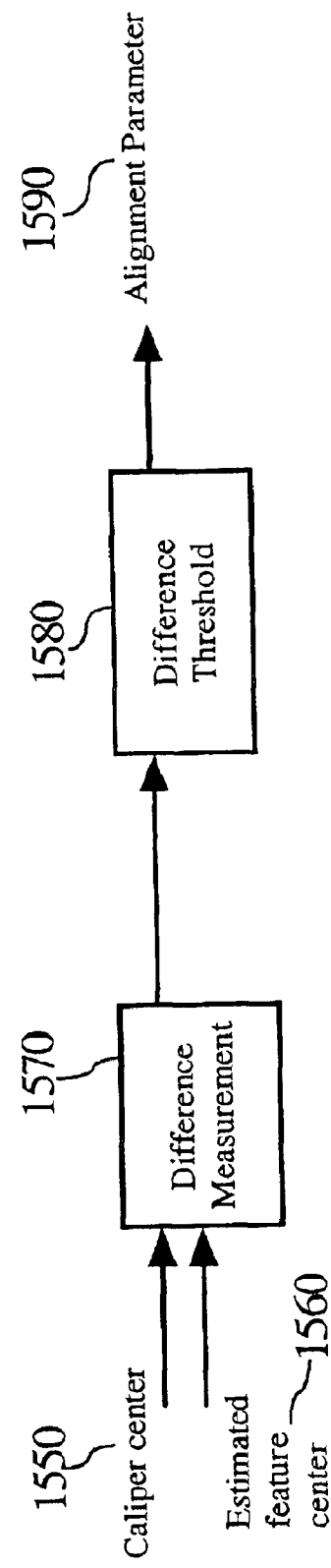
FIG. 15B shows the processing flow of the circle/arc caliper alignment decision step.

As shown in FIG. 15, the alignment decision step compares the caliper direction 1500 or center 1550 with the estimated feature direction 1510 or center 1560. If the difference is greater than an acceptable threshold value, the caliper region is re-aligned (direction change for box caliper region and center change for circle or arc caliper) to match the estimated parameters.

In one embodiment of the invention, the difference measurement 1520 between estimated feature direction and a box caliper direction can be defined as $$Diff\_box = COS^{-1}(a_c*a_e+b_c*b_e)$$

Where $(a_c, b_c)$ is the unit direction vector specified by the box caliper and $(a_e, b_e)$ is the estimated unit direction vector from the image.

The re-alignment of box caliper will be performed if a difference threshold 1530 is exceeded $$Diff\_box > T_{box}$$

Where $T_{box}$ is the box caliper alignment threshold.

In this case, the estimated feature direction is the alignment parameter 1540. Otherwise, the alignment parameter is set to 0.

Similarly, in one embodiment of the invention, the difference measurement 1570 between the estimated center and the center of a circle or an arc caliper can be defined as $$Diff\_circle/arc = \sqrt{(x_c-x_e)^2+(y_c-y_e)^2}$$

Where $(x_c, y_c)$ is the center position specified by the caliper and $(x_e, y_e)$ is the estimated center position from the image.

The re-alignment of circle/arc caliper will be performed if a difference threshold 1580 is exceeded $$Diff\_circle/arc > T_{circle/arc}$$

Where $T_{circle/arc}$ is the circle/arc caliper alignment threshold.

In this case, the estimated center position is the alignment parameter 1590. Otherwise, the alignment parameter is set to 0.

III.3 Structure Alignment

The re-alignment of box caliper changes its direction vector to $(a_e, b_e)$ yet keeps the same values for its center (x_c, y_c), length (L) width (w), and the number of detection scans (N_s).

The re-alignment of circle/arc caliper simply changes its center location to $(x_e, y_e)$ and keeps all other caliper parameters unchanged.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A structure estimation module comprising:
   a. means to receive an image input;
   b. means to receive an application domain structure input;
   c. a preprocessing module that receives the image input having a pre-processed image output;
   d. a distributed estimation module that receives the pre-processed image and application domain structure inputs having an estimated structure output wherein the distributed estimation module comprises
      i. a sub-region generation module having a sub-region output;
      ii. a robust structure-guided estimation module that receives the sub-region output and a box caliper input having a feature parameter output wherein the box caliper robust structure-guided estimation module comprises:
         (a) means to perform row-wise robust feature direction estimation and weight adjustment having an adjusted weight output;
         (b) means to perform column-wise robust feature direction estimation and weight adjustment having an adjusted weight output;
         (c) means to perform overall robust feature direction estimation and weight adjustment having a feature direction estimation result.

2. A structure estimation module comprising:
   a. means to receive an image input;
   b. means to receive an application domain structure input;
   c. a preprocessing module that receives the image input having a pre-processed image output;
   d. a distributed estimation module that receives the pre-processed image and application domain structure inputs having an estimated structure output wherein the distributed estimation module comprises
      i. a sub-region generation module having a sub-region output;
      ii. a robust structure-guided estimation that receives the sub-region output and a circle caliper input having a feature parameter output wherein the circle caliper robust structure-guided estimation module comprises:
  (a) means to perform radial-wise robust center estimation and weight adjustment having adjusted weight output;
  (b) means to perform angular-wise robust center estimation and weight adjustment having adjusted weight output;
  (c) means to perform overall robust center estimation and weight adjustment having center estimation output.

3. A structure estimation module comprising:
a. means to receive an image input;
b. means to receive an application domain structure input;
c. a preprocessing module that receives the image input having a pre-processed image output;
d. a distributed estimation module that receives the pre-processed image and application domain structure inputs having an estimated structure output wherein the distributed estimation module comprises
  i. a sub-region generation module having a sub-region output;
  ii. a robust structure-guided estimation module that receives the sub-region output and an arc caliper input having a feature parameter output wherein the arc caliper robust structure-guided estimation module comprises:
    (a) means to perform radial-wise robust center estimation and weight adjustment having adjusted weight output;
    (b) means to perform angular-wise robust center estimation and weight adjustment having adjusted weight output;
    (c) means to perform overall robust center estimation and weight adjustment having center estimation output.

4. A robust feature direction estimation and weight adjustment method for a group of box caliper sub-regions comprises:
  (a) for each sub-region, estimate the feature direction using line estimation without constraints;
  (b) for a group of sub-regions, estimate the feature direction using line estimation constrained by a parallelism relation;
  (c) compare the sub-region feature direction estimated in step (a), with the group direction estimated in step (b) and adjust weight for the sub-region based on an error function;
  (d) update and output the group of sub-regions box caliper estimate of the feature direction.

5. A robust feature direction estimation and weight adjustment method for a group of circle caliper sub-regions comprises:
  (a) for each sub-region, estimate the center of a circular arc without constraints;
  (b) for a group of sub-regions, estimate the center of circular arcs constrained by the same center point;
  (c) compare the sub-region center estimated in step (a), with the group center estimated in step (b) and adjust the weight for the sub-region base on an error function;
  (d) update and output the group of sub-regions center.

6. A robust feature direction estimation and weight adjustment method for a group of arc caliper sub-regions comprises the following step:
  (a) for each sub-region, estimate the center of a circular arc without constraints;
  (b) for a group of sub-regions, estimate the center of circular arcs constrained by the same center point;
  (c) compare the sub-region center estimated in step (a), with the group center estimated in step (b) and adjust weight for the sub-region based on an error function;
  (d) update and output the group of sub-regions estimate for the center circular arcs.

7. The method of claim 4 further comprising a step for re-alignment of the box caliper direction vector responsive to the group of sub-regions estimate of the feature direction output.

8. The method of claim 5 further comprising a step for re-alignment of the circle caliper center location responsive to the output of the group of sub-regions estimate of the center of circular arcs output.

9. The method of claim 6 further comprising a step for re-alignment of the arc caliper center location responsive to the output of the group of sub-regions estimate of the center of circular arcs output.

* * * * *